(12) United States Patent
Gong et al.

(10) Patent No.: US 10,628,038 B2
(45) Date of Patent: Apr. 21, 2020

(54) TOUCHPAD-BASED FAST INFORMATION INPUT INTERACTION METHOD AND INPUT INTERACTION SYSTEM

(71) Applicant: BEIJING LUCKEY TECHNOLOGY CO., LTD., Beijing (CN)

(72) Inventors: Huachao Gong, Beijing (CN); Xudong He, Beijing (CN)

(73) Assignee: BEIJING LUCKEY TECHNOLOGY CO., LTD., Beijing (CN)

( * ) Notice: Subject to any disclaimer, the term of this patent is extended or adjusted under 35 U.S.C. 154(b) by 36 days.

(21) Appl. No.: 15/891,366

(22) Filed: Feb. 7, 2018

(65) Prior Publication Data

US 2019/0065045 A1 Feb. 28, 2019

Related U.S. Application Data

(63) Continuation of application No. PCT/CN2017/100129, filed on Sep. 1, 2017.

(30) Foreign Application Priority Data

Aug. 24, 2017 (CN) .......................... 2017 1 0735249

(51) Int. Cl.
*G06F 3/0488* (2013.01)
*G06F 3/0489* (2013.01)
(Continued)

(52) U.S. Cl.
CPC .......... *G06F 3/04886* (2013.01); *G06F 3/038* (2013.01); *G06F 3/0416* (2013.01); *G06F 3/04883* (2013.01); *G06F 3/04892* (2013.01)

(58) Field of Classification Search
CPC .... G06F 3/04886; G06F 3/0416; G06F 3/038; G06F 3/04883; G06F 3/04892
See application file for complete search history.

(56) References Cited

U.S. PATENT DOCUMENTS

2007/0035419 A1* 2/2007 Wang .................. G06F 3/03547
341/22
2010/0099463 A1 4/2010 Kim et al.
(Continued)

FOREIGN PATENT DOCUMENTS

| CN | 101699381 A | 4/2010 |
| CN | 101833409 A | 9/2010 |

(Continued)

OTHER PUBLICATIONS

Extended European Search Report for corresponding EU patent application No. 178379293, dated Nov. 15, 2018, 20 pages total.

(Continued)

*Primary Examiner* — Aneeta Yodichkas
(74) *Attorney, Agent, or Firm* — Westbridge IP LLC (57) ABSTRACT

The disclosure discloses a touchpad-based fast information input interaction method and system. The system comprises: an area dividing module to divide the touchpad into a plurality of areas; a correlation database creation and storage module to create and store a database regarding the touchpad coordinate areas and key code values and a database regarding the key code values and stored contents; a touchpad function switching module to switch the touchpad into keyboard function; a trigger action signal and coordinate information obtaining module to obtain a trigger action signal on the touchpad and the coordinate information of the corresponding position on the touchpad where the trigger action signal has been generated; a key code value determination and execution module to determine the key code value for searching the corresponding content from the database, and input the content in the position of the cursor or execute a corresponding instruction.

6 Claims, 7 Drawing Sheets

(51) Int. Cl.
*G06F 3/038* (2013.01)
*G06F 3/041* (2006.01)

(56) References Cited

U.S. PATENT DOCUMENTS

2010/0164880 A1* 7/2010 Huang .................. G06F 3/0213
                                                           345/173
2014/0340310 A1* 11/2014 Cheng .................. G06F 3/0487
                                                           345/158

FOREIGN PATENT DOCUMENTS

| CN | 102841730 A | 12/2012 |
| CN | 103389869 A | 11/2013 |
| CN | 104850352 A | 8/2015 |
| JP | H11102247 A | 4/1999 |
| JP | 2013520860 A | 6/2013 |
| JP | 2014052864 A | 3/2014 |
| JP | 2014106730 A | 6/2014 |

OTHER PUBLICATIONS

First Office Action in counterpart Chinese Application No. 201710735249.0, dated Jul. 1, 2019.
International Search Report in corresponding PCT Application No. PCT/CN2017/100129, dated May 23, 2018.
Office Action in counterpart EP Application No. 17837929.3, dated Oct. 24, 2019.
Office Action in counterpart Japanese Application No. 2018-502402, dated Dec. 3, 2019.
Second Office Action in counterpart Chinese Application No. 201710735249.0, dated Dec. 6, 2019.
Written Opinion in corresponding PCT Application No. PCT/CN2017/100129, dated May 23, 2018.

* cited by examiner

TOUCHPAD-BASED FAST INFORMATION INPUT INTERACTION METHOD AND INPUT INTERACTION SYSTEM

CROSS-REFERENCE OF THE RELATED APPLICATIONS

The application is a continuation of International Patent Application No. PCT/CN2017/100129, with an international filing date of Sep. 1, 2017, which claims the priority of China Patent Application No. 201710735249.0, filed on Aug. 24, 2017, the entire contents of which are hereby incorporated by reference as part of the application.

TECHNICAL FIELD

The present disclosure relates to a touchpad-based fast information input interaction method and an input interaction system thereof, which belong to the field of touchpad-based information input technology.

BACKGROUND

Keyboard and mouse are currently the main information input devices, which have given people a lot of convenience. However, keyboards configured for laptop and desktop respectively are quite different—most laptop keyboards do not have a keypad, but a small touchpad beneath them. Although the touchpad can generally be used for sliding operation in games or used as a mouse to drag a webpage by using the scrollbar on the right side of the touchpad, the function thereof is still single and fails to effectively satisfy users' needs.

Today in the information era, people often need to repeatedly input the same information in many situations. For example, when registering a website, people often need to input a mobile phone number or an email address, and when performing bank webpage operations, they often need to repeatedly input a bank card number or an identity card number and the like. These non-smart operations not only waste a lot of time, but also are prone to mistakes. Although it can be convenient to perform various types of repetitive operations by manipulating hot keys on existing keyboards, the contents these hot keys can enter are predetermined and cannot be customized. The above-mentioned problems are effectively solved by the "touchpad-based fast information input system and input method" disclosed in the patent application with the application number of 201510289131.0, which however still have the following disadvantages:

1, the keyboard layouts in different countries in the world are different, for example, the keyboard layouts in Japan, Europe, the United States and China differ from one another, for example, a key code value may correspond to E in a Chinese keyboard, to F in an American keyboard, and to G in a Japanese keyboard, so the abovementioned technology cannot be universally applicable to different countries;

2, each touchpad area corresponds to only one instruction or one input content, making the touchpad less efficient;

3, the above-mentioned application refers to only shielding the mouse function of the touchpad, but cannot realize the switching between the mouse function and keyboard function of the touchpad, which is very inconvenient to use;

4, the technical solutions thereof have a single function and are not sufficiently convenient. For example, when a counter is needed for calculating values in a table, the calculator has to be manually started, resulting in a waste of time. In addition, if one cell in a table has been edited and another cell needs to be edited, it is generally required to shield the keyboard function of the touchpad and start the mouse function first, and then shield the mouse function and start the keyboard function after moving to a specific position. The process is troublesome and time-consuming.

5, the above-mentioned application can only achieve fast information inputting, for example, can achieve ID number inputting through a hot key, but cannot achieve the inputting of a system shortcut key or a combination of system shortcut key or a macro command.

SUMMARY

An object of the present disclosure is to provide a touchpad-based fast information input interaction system and an input method thereof, which can effectively solve the problems in the prior art, especially the problem that each touchpad area corresponds to only one type of instruction or one input content, resulting in the low efficiency of the touchpad.

In order to solve the above-mentioned technical problem, the present disclosure adopts the following technical solution: a touchpad-based fast information input interaction method, comprising the following steps:

S1, dividing a touchpad into a plurality of areas by coordinate points;

S2, creating a database including the correlation between the touchpad coordinate areas and key code values and a database including the correlation between the key code values and stored contents, wherein each touchpad coordinate area corresponds to one or more key code values;

S3, switching the touchpad into keyboard function; obtaining, by the operating system, a trigger action signal on the touchpad and the coordinate information of the corresponding position on the touchpad where the trigger action signal has been generated; wherein the keyboard function and mouse function of the touchpad can be switched therebetween;

S4, determining the key code value used, searching the corresponding content from the database, inputting the content in the position of the cursor or executing the corresponding instruction.

Preferably, in step S1, a label may be attached onto the touchpad, or visible coordinate areas of the touchpad may be formed, to further improve the utilization of the touchpad.

Preferably, step S4 comprises: detecting the current application program (may by determining the current top window or application program in the system), determining the key code value used according to the type of the application program, searching the corresponding content from the database, executing the corresponding instruction (that is, equivalent to that the stored content being an instruction); wherein the key code values correspond, one to one, to the stored contents (that is, one key code value corresponds to one content). Thus, each touchpad area can correspondingly execute a plurality of instructions, thereby further maximizing the utilization of the touchpad area.

In the touchpad-based fast information input interaction method of the present disclosure, step S4 comprises: detecting the version or language of the current operating system, determining the key code value used according to the version type or the language type of the operating system, searching the corresponding content from the database, inputting the content in the position of the cursor; wherein the key code values correspond one to one to the stored contents (that is, one key code value corresponds to one content). Thus, the fast information input technology of the present disclosure can be universally applicable to different countries.

In the above touchpad-based fast information input interaction method, in step S2, each touchpad coordinate area corresponds to one or more key code values, and these key code values correspond to shortcut keys (for example, adjusting brightness or volume, etc.) or shortcut key combinations (that is, a plurality of key code values correspond to one content, and the content may be, for example, copy, paste, or copy and paste combination (Ctrl+C and Ctrl+V combination), etc.) or a macro command. Thus, the inputting of system shortcut keys or the combinations of system shortcut keys or macro commands can be achieved. For example, in repetitive work, the following system operations, including repeatedly opening a table, copying, pasting, closing, or adjusting brightness, volume, etc., may be achieved.

In the above-mentioned touchpad-based fast information input interaction method, in step S3, the switching between the keyboard function and the mouse function of the touchpad is implemented in the following manner:

S31, setting a specific shortcut key or a specific gesture (such as a graphic gesture C or sliding from the outside to the touchpad or sliding from switching area A of the touchpad to switching area B, etc.) corresponding to the switching between the keyboard function and mouse function of the touchpad, and storing the specific shortcut key and the specific gesture into the database;

S32, detecting the I/O port of the system, and when the corresponding shortcut key (such as Alt+X) or gesture (such as C) has been detected, switching between the keyboard function and the mouse function of the touchpad.

Through the abovementioned method, the keyboard function and the mouse function of the touchpad can be conveniently and flexibly switched during the use of the touchpad.

Preferably, the gesture described in step S31 comprises: a gesture identifier (such as C) or a gesture action of sliding from the outside to the touchpad or a gesture action of sliding from the switching area A of the touchpad to the switching area B (the switching area A can be set on four corners of the touchpad, and the rest of the touchpad is the switching area B; the switching area A can also be set on the sides of the touchpad, and by the same token, the rest is the switching area B). Thus, the abovementioned gesture can be used to fast and accurately realize the switching between the mouse function and keyboard function of the touchpad.

Preferably, step S4 further comprises: searching the corresponding content from the database, inputting the content in the position of the cursor or executing a corresponding instruction, and then switching the touchpad into mouse function in the following manner: setting the length of one track as a threshold, when it is detected that the length of an inputted track is greater than the threshold, automatically switching the touchpad into the mouse function. Through this method, users can fast and accurately switch the touchpad from the keyboard function to the mouse function. Especially in table editing, when one cell has been edited and then another cell needs to be edited, users do not have to first switch the keyboard function of the touchpad to the mouse function, but can perform editing directly after moving the cursor to a specific location, thus saving a lot of time with the simple and convenient operation.

In the above touchpad-based fast information input interaction method, the switching between the keyboard function and the mouse function of the touchpad further comprises: binding the starting function of the application program with the keyboard function of the touchpad; when the touchpad is switched into keyboard function, starting the application program; when the touchpad is switched into mouse function, closing the application program, further facilitating the use thereof. For example, with respect to table editing, when the mouse function of the touchpad is switched to the keyboard function, the calculator is started at the same time, saving the time of users from manually starting the application program.

Further preferably, the switching between the keyboard function and the mouse function of the touchpad further comprises: binding the starting function of the application program with the keyboard function of the touchpad; determining the type of the application program that is currently started (may be determined by the current top window or application program of the system), and according to the type of the application program, controlling whether to start the application program when the touchpad is switched into keyboard function and whether to close the application program when the touchpad is switched into mouse function. For example, it can be set as follows: if the currently started application program is Excel, then when the touchpad is switched into keyboard function, the calculator program can be controlled to be started at the same time; if the currently started application program is Taobao, then when the touchpad is switched into keyboard function, there is no need to control the calculator program to be started at the same time, thereby further adapting to users' needs and providing convenience.

Preferably, step S4 further comprises: searching the corresponding content from the database, inputting the content in the position of the cursor or executing the corresponding instruction, then switching the touchpad into mouse function and closing the application program in the following manner: setting the length of one track as a threshold, when it is detected that the length of an inputted track is greater than the threshold, automatically switching the touchpad to the mouse function and closing the application program, thus achieving automatically closing the application program conveniently and promptly.

A touchpad-based fast information input interaction system, comprises:

an area dividing module, configured to divide the touchpad into a plurality of areas by coordinate points;

a correlation database creation and storage module, configured to create and store a database including the correlation between the touchpad coordinate areas and key code values and a database including the correlation between the key code values and stored contents, wherein each touchpad coordinate area corresponds to two or more key code values;

a touchpad function switching module, configured to switch the touchpad into keyboard function, wherein the keyboard function and the mouse function of the touchpad can be switched therebetween;

a trigger action signal and coordinate information obtaining module, configured to obtain, by operating system, a trigger action signal on the touchpad and the coordinate information of the corresponding position on the touchpad where the trigger action signal has been generated;

a key code value determination and execution module, configured to determine the key code value used, search the corresponding content from a database, and input the content in the position of the cursor or execute the corresponding instruction.

Preferably, the key code value determination and execution module comprises:

an application program detection module, configured to detect the current application program;

a first determination and action execution sub-module, configured to determine the used key code value according to the type of the application program, search the corresponding content from the database and execute the corresponding instruction (that is, equivalent to that the stored content being an instruction); wherein the key code values correspond one to one to the stored contents (that is, one key code value corresponds to one content).

Preferably, the key code value determination and execution module comprises:

an operating system version or language detection module, configured to detect the version or language of the current operating system;

a second determination and action execution sub-module, configured to determine the key code value used according to the version type or language type of the operating system, then search the corresponding content from the database and input the content in the position of the cursor, wherein the key code values correspond one to one to the stored contents (that is, one key code value corresponds to one content).

In the touchpad-based fast information input interaction system of the present disclosure, in the correlation database creation and storage module, each touchpad coordinate area corresponds to one or more key code values, and these key code values correspond to shortcut keys or shortcut key combinations (i.e., a plurality of key code values correspond to one content, for example, the content may be copy, paste, or copy and paste combination (Ctrl+C and Ctrl+V combination), etc.) or macro command.

Preferably, the touchpad function switching module comprises:

a first setting and storage module, configured to set a specific shortcut key (such as Alt+X) or a specific gesture (such as a graphic gesture C or sliding from the outside to the touchpad or sliding from the switching area A of the touchpad to the switching area B) corresponding to the switching between the keyboard function and the mouse function of the touchpad, and store the specific shortcut key and the specific gesture into the database (during the setting, the shortcut key or the sliding of the gesture is detected, the key code value is recorded and stored in the database for the shortcut key, a series of coordinate values corresponding to the gesture are recorded and stored in the database for the gesture);

a first detection and action execution module, configured to detect the I/O port of the system, and when a corresponding shortcut key (such as Alt+X) or gesture (such as C) is detected, switching between the keyboard function and the mouse function of the touchpad is performed.

More preferably, the gesture in the setting and storage module comprises: a gesture identifier (such as C) or a gesture action of sliding from the outside to the touchpad or a gesture action of sliding from the switching area A of the touchpad to the switching area B (the switching area A can be set on four corners of the touchpad, and the rest is the switching area B; the switching area A can also be set on the sides of the touchpad, and by the same token, the rest is the switching area B).

The foregoing touchpad-based fast information input interaction system further comprises:

a first mouse function switching module, configured to search the corresponding content from the database, input the content in the position of the cursor or execute the corresponding instruction, and then switch the touchpad into mouse function in the following manner: setting the length of one track as a threshold, when it is detected that the length of an inputted track is greater than the threshold, automatically switching the touchpad to the mouse function.

Preferably, the touchpad function switching module comprises:

a binding module, configured to bind the starting function of the application program with the keyboard function of the touchpad;

a second setting and storage module, configured to set a specific shortcut key (such as Alt+X) or a specific gesture (for example, a graphic gesture C or sliding from the outside to the touchpad or sliding from the switching area A of the touchpad to the switching area B) corresponding to the switching between the keyboard function and the starting function of the application program and the mouse function of the touchpad, and store the specific shortcut key and the specific gesture into the database;

a second detection and action execution module, configured to detect the I/O port of the system, and when a corresponding shortcut key (such as Alt+X) or gesture (such as C) is detected, switching between the keyboard function and the starting function of the application program and the mouse function of the touchpad is performed; when the touchpad is switched to the keyboard function, start the application program; when the touchpad is switched into mouse function, the application program is closed.

Further preferably, the second detection and action execution module further comprises:

an application program type determination module, configured to determine the type of the currently started application program.

Preferably, the system of the present disclosure further comprises:

a second mouse function switching module, configured to search the corresponding content from the database, input the content in the position of the cursor or execute the corresponding instruction, then switch the touchpad to the mouse function and close the application program in the following manner: setting the length of one track as a threshold, when it is detected that the length of an inputted track is greater than the threshold, automatically switching the touchpad into mouse function and closing the application program.

Compared with the prior art, the present disclosure has the following advantages:

1, by utilizing each touchpad coordinate area corresponding to one or more key code values, determining the key code value used when the operating system obtains a trigger action signal on the touchpad and the coordinate information of the corresponding position on the touchpad where the trigger action signal has been generated, searching the corresponding content from the database, and inputting the content in the position of the cursor or executing the corresponding instruction, the present disclosure further improves the utilization of the touchpad;

2, by detecting the current application program, determining the key code value used according to the type of the application program, searching the corresponding content from the database, and executing the corresponding instruction (that is, equivalent to that the stored content being an instruction; for example, a certain touchpad area corresponds to two key code values, where one key code value corresponds to A and the other key code value corresponds to "←". When it is detected that the current application program is a text editor, the first key code value is used, and the instruction A is executed; when it is detected that the current application program is a game, the second key code value is used and the exit instruction "←" is executed; wherein the key code values correspond one to one to the stored contents (that is, one key code value corresponds to one content), the present disclosure enables each touchpad area to execute a plurality of instructions correspondingly and further maximizes the utilization of the touchpad area;

3, by detecting the version or language of the current operating system, determining the key code used according to the version type or language type of the operating system, searching the corresponding content from the database, and inputting the content in the position of the cursor, wherein the key code values correspond one to one to the stored contents (that is, one key code value corresponds to one content), thus the fast information input technology of the present disclosure can be universally applicable to different countries, 4, by setting each touchpad coordinate area to correspond to one or more key code values, wherein these key code values correspond to shortcut keys (for example, adjusting brightness or volume, etc.), shortcut key combinations (that is, a plurality of key code values correspond to one content, and the content can be, for example, copy, paste or copy and paste combination (Ctrl+C and Ctrl+V combination), etc.) or macro commands, the present disclosure achieves the inputting of a system shortcut key or a system shortcut key combination or a macro command. For example, with respect to repetitive work, the following system operations, including repeatedly opening a table, copying, pasting, closing, or adjusting brightness, volume, etc., may be achieved, thereby further improving the utilization of the touchpad;

5, by setting a specific shortcut key (such as Alt+X) or gesture (such as a graphic gesture C or sliding from the outside to the touchpad or sliding from the switching area A of the touchpad to the switching area B) corresponding to the switching between the keyboard function and mouse function of the touchpad, storing the same into the database, detecting the I/O port of the system, and when corresponding shortcut key (such as Alt+X) or gesture (such as C) is detected, switching between the keyboard function and the mouse function of the touchpad is performed, the present disclosure can facilitate the flexible switching between the mouse function and keyboard function of the touchpad during use;

6, by utilizing a gesture identifier (such as C) or a gesture action of sliding from the outside to the touchpad or a gesture action of sliding from the switching area A of the touchpad to the switching area B (the switching area A can be set on the four corners of the touchpad, and the rest is the switching area B; the switching area A can also be set on the sides of the touchpad, and by the same token, the rest is the switching area B), the present disclosure can trigger the fast and accurate switching between the mouse function and the keyboard function of the touchpad.

7, by setting the length of one track as a threshold, when it is detected that the length of an inputted track is greater than the threshold, automatically switching the touchpad to the mouse function, the present disclosure facilitates users to fast and accurately switch the touchpad from the keyboard function to the mouse function. Especially for table editing, when one cell is edited and another cell needs to be edited, users do not have to first switch the keyboard function of the touchpad to the mouse function, but can perform editing directly after moving the cursor to a specific location, thus saving a lot of time with the simple and convenient operation.

8, by binding the starting function of the application program with the keyboard function of the touchpad, when the touchpad is switched into keyboard function, the application program is started, and when the touchpad is switched into mouse function, the application program is closed, the present disclosure further facilitates the use thereof. For example, with respect to table editing, when the mouse function of the touchpad is switched into keyboard function, the calculator is started at the same time, thus saving the users' time from manually starting the application program.

The present disclosure will be further described below with reference to the accompanying drawings and specific embodiments.

DETAILED DESCRIPTION OF THE EMBODIMENTS

Figure 1:
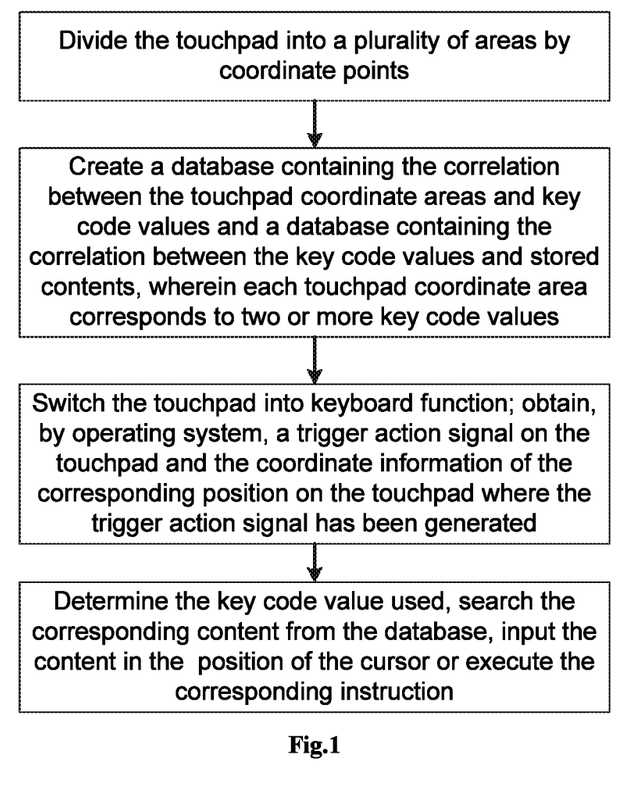
FIG. 1 is a flow chart of the method of embodiment 1 of the present disclosure.

Embodiment 1 of the present disclosure: a touchpad-based fast information input interaction method, as shown in FIG. 1, comprising the following steps:

S1, dividing a touchpad into a plurality of areas by coordinate points;

S2, creating a database including the correlation between the touchpad coordinate areas and key code values and a database including the correlation between the key code values and stored contents, wherein each touchpad coordinate area corresponds to one or more key code values;

S3, switching the touchpad into keyboard function; obtaining, by the operating system, a trigger action signal on the touchpad and the coordinate information of the corresponding position on the touchpad where the trigger action signal has been generated; wherein the keyboard function and mouse function of the touchpad can be switched therebetween;

S4, determining the key code value used, searching the corresponding content from the database, inputting the content in the position of the cursor or executing the corresponding instruction.

A touchpad-based fast information input interaction system comprising:

an area dividing module, configured to divide the touchpad into a plurality of areas by coordinate points;

a correlation database creation and storage module, configured to create and store a database including the correlation between the touchpad coordinate areas and key code values and a database including the correlation between the key code values and stored contents, wherein each touchpad coordinate area corresponds to one or more key code values;

a touchpad function switching module, configured to switch the touchpad into keyboard function, wherein the keyboard function and the mouse function of the touchpad can be switched therebetween;

a trigger action signal and coordinate information obtaining module, configured to obtain, by operating system, a trigger action signal on the touchpad and the coordinate information of the corresponding position on the touchpad where the trigger action signal has been generated;

a key code value determination and execution module, configured to determine the key code value used, search the corresponding content from the database, and input the content in the position of the cursor or execute the corresponding instruction.

Figure 2:
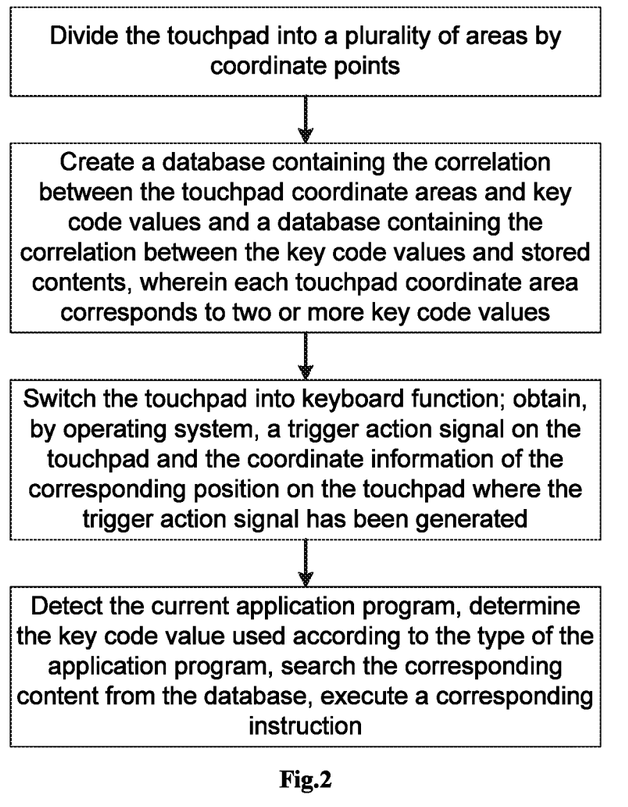
FIG. 2 is a flow chart of the method of embodiment 2.

Embodiment 2: a touchpad-based fast information input interaction method, as shown in FIG. 2, comprising the following steps:

S1, dividing the touchpad into a plurality of areas by coordinate points;

S2, creating a correlation database between the touchpad coordinate areas and key code values and a database including the correlation between the key code values and stored contents, wherein each touchpad coordinate area corresponds to one or more key code values;

S3, switching the touchpad into keyboard function; obtaining, by the operating system, a trigger action signal on the touchpad and the coordinate information of the corresponding position on the touchpad where the trigger action signal has been generated; wherein the keyboard function and the mouse function of the touchpad can be switched therebetween;

S4, determining the key code value used, searching the corresponding content from the database, inputting the content in the position of the cursor or executing the corresponding instruction; comprising: detecting the current application program, determining the key code value used according to the type of the application program, searching the corresponding content from the database, executing the corresponding instruction (that is, equivalent to that the stored content is an instruction); wherein the key code values correspond one to one to the stored contents (that is, one key code value corresponds to one content).

A touchpad-based fast information input interaction system, comprising:

an area dividing module, configured to divide the touchpad into a plurality of areas by coordinate points;

a correlation database creation and storage module, configured to create and store a database including the correlation between the touchpad coordinate areas and key code values and a database including the correlation between the key code values and stored contents, wherein each touchpad coordinate area corresponds to one or more key code values;

a touchpad function switching module, configured to switch the touchpad into keyboard function, wherein the keyboard function and the mouse function of the touchpad can be switched therebetween;

a trigger action signal and coordinate information obtaining module, configured to obtain, by operating system, a trigger action signal on the touchpad and the coordinate information of the corresponding position on the touchpad where the trigger action signal has been generated;

a key code value determination and execution module, configured to determine the key code value used, search the corresponding content from the database, and input the content in the position of the cursor or execute the corresponding instruction.

The key code value determination and execution module comprises:

an application program detection module, configured to detect the current application program;

a first determination and action execution sub-module, configured to determine the key code value used according to the type of the application program, search the corresponding content from the database and execute a corresponding instruction (that is, equivalent to that the stored content being an instruction); wherein the key code values correspond one to one to the stored contents (that is, one key code value corresponds to one content).

Figure 3:
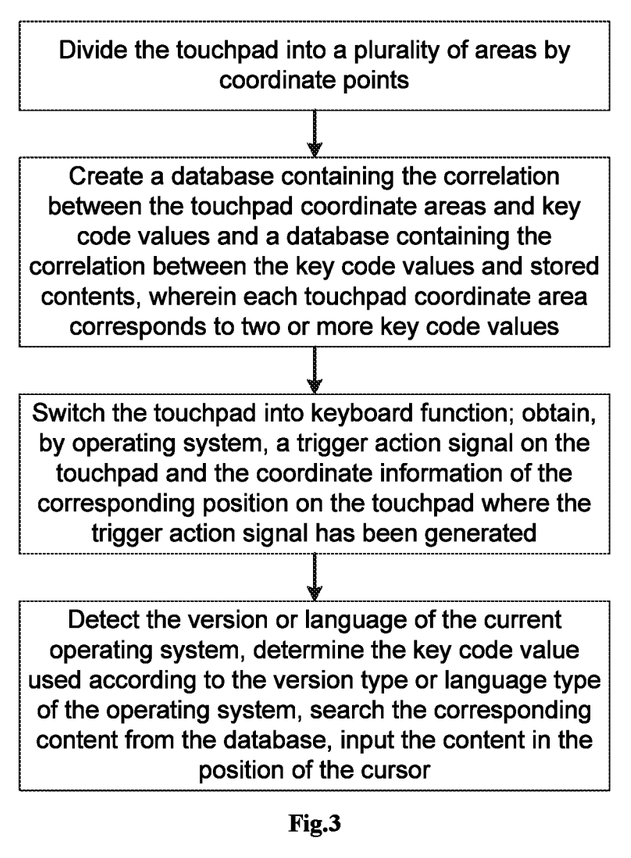
FIG. 3 is a flowchart of the method of embodiment 3.
Figure 4:
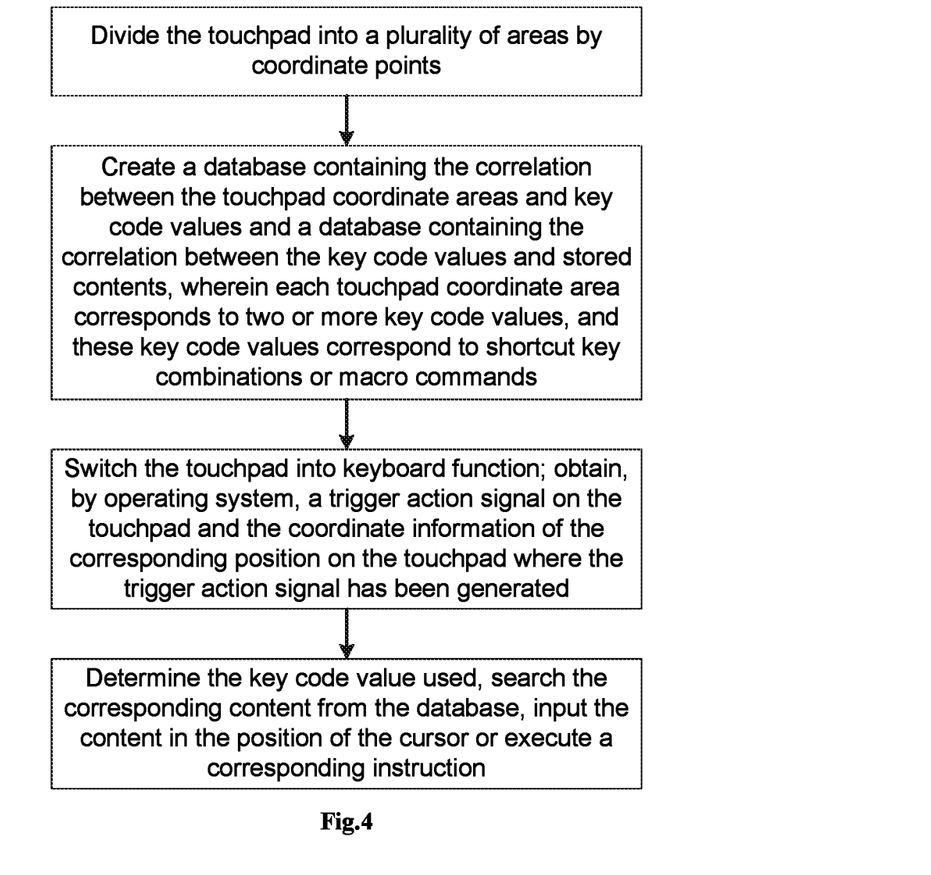
FIG. 4 is a flowchart of the method of embodiment 4.

Embodiment 3: a touchpad-based fast information input interaction method, as shown in FIG. 3, comprising the following steps:

S1, dividing the touchpad into a plurality of areas by coordinate points;

S2, creating a database including the correlation between the touchpad coordinate areas and key code values and a database including the correlation between the key code values and stored contents, wherein each touchpad coordinate area corresponds to one or more key code values;

S3, switching the touchpad into keyboard function; obtaining, by the operating system, a trigger action signal on the touchpad and the coordinate information of the corresponding position on the touchpad where the trigger action signal has been generated; wherein the keyboard function and the mouse function of the touchpad can be switched therebetween;

S4, determining the key code value used, searching the corresponding content from the database, inputting the content in the position of the cursor or executing the corresponding instruction; comprising: detecting the version or language of the current operating system, determining the key code value used according to the version type or language type of the operating system, searching the corresponding content from the database, inputting the content in the position of the cursor; wherein the key code values correspond one to one to the stored contents (that is, one key code value corresponds to one content).

A touchpad-based fast information input interaction system, comprising:

an area dividing module, configured to divide the touchpad into a plurality of areas by coordinate points;

a correlation database creation and storage module, configured to create and store a database including the correlation between the touchpad coordinate areas and key code values and a database including the correlation between the key code values and stored contents, wherein each touchpad coordinate area corresponds to one or more key code values;

a touchpad function switching module, configured to switch the touchpad into keyboard function, wherein the keyboard function and the mouse function of the touchpad can be switched therebetween;

a trigger action signal and coordinate information obtaining module, configured to obtain, by operating system, a trigger action signal on the touchpad and the coordinate information of the corresponding position on the touchpad where the trigger action signal has been generated;

a key code value determination and execution module, configured to determine the key code value used, search the corresponding content from the database, and input the content in the position of the cursor or execute the corresponding instruction.

The key code value determination and execution module comprises:

an operating system version or language detection module, configured to detect the version or language of the current operating system;

a second determination and action execution sub-module, configured to determine the key code value used according to the version type or language type of the operating system, then search the corresponding content from the database and input the content in the position of the cursor, wherein the key code values correspond one to one to the stored contents (that is, one key code value corresponds to one content).

Embodiment 4: a touchpad-based fast information input interaction method, comprising the following steps:

S1, dividing the touchpad into a plurality of areas by coordinate points;

S2, creating a database including the correlation between the touchpad coordinate areas and key code values and a database including the correlation between the key code values and stored contents, wherein each touchpad coordinate area corresponds to one or more key code values, and these key code values correspond to shortcut keys (for example, adjusting brightness or volume, etc.) or shortcut key combinations (that is, a plurality of key code values correspond to one content, and the content may be copy, paste, or copy and paste combination (Ctrl+C and Ctrl+V combination), etc.) or a macro command.

S3, switching the touchpad into keyboard function; obtaining, by the operating system, a trigger action signal on the touchpad and the coordinate information of the corresponding position on the touchpad where the trigger action signal has been generated; wherein the keyboard function and the mouse function of the touchpad can be switched therebetween;

S4, determining the key code value used, searching the corresponding content from the database, inputting the content in the position of the cursor or executing the corresponding instruction.

A touchpad-based fast information input interaction system, comprising:

an area dividing module, configured to divide the touchpad into a plurality of areas by coordinate points;

a correlation database creation and storage module, configured to create and store a database including the correlation between the touchpad coordinate areas and key code values and a database including the correlation between the key code values and stored contents, wherein each touchpad coordinate area corresponds to one or more key code values, and these key code values correspond to shortcut keys (for example, adjusting brightness or volume, etc.) or shortcut key combinations (that is, a plurality of key code values correspond to one content, and the content may be copy, paste, or copy and paste combination (Ctrl+C and Ctrl+V combination), etc.) or a macro command;

a touchpad function switching module, configured to switch the touchpad into keyboard function, wherein the keyboard function and the mouse function of the touchpad can be switched therebetween;

a trigger action signal and coordinate information obtaining module, configured to obtain, by operating system, a trigger action signal on the touchpad and the coordinate information of the corresponding position on the touchpad where the trigger action signal has been generated;

a key code value determination and execution module, configured to determine the key code value used, search the corresponding content from a database, and input the content in the position of the cursor or execute the corresponding instruction.

Embodiment 5: a touchpad-based fast information input interaction method, comprising the following steps:

S1, dividing the touchpad into a plurality of areas by coordinate points;

S2, creating a database including the correlation between the touchpad coordinate areas and key code values and a database including the correlation between the key code values and stored contents, wherein each touchpad coordinate area corresponds to one or more key code values;

S3, switching the touchpad into keyboard function; obtaining, by the operating system, a trigger action signal on the touchpad and the coordinate information of the corresponding position on the touchpad where the trigger action signal has been generated; wherein the switching between the keyboard function and the mouse function of the touchpad is realized in the following manner: wherein the keyboard function and the mouse function of the touchpad can be switched therebetween;

S31, setting a specific shortcut key or a specific gesture (such as a graphic gesture C or sliding from the outside to the touchpad or sliding from switching area A of the touchpad to switching area B, etc.) corresponding to the switching between the keyboard function and the mouse function of the touchpad, and storing the specific shortcut key and the specific gesture into the database;

S32, detecting the I/O port of the system, and when the corresponding shortcut key (such as Alt+X) or gesture (such as C) is detected, switching between the keyboard function and the mouse function of the touchpad is performed.

S4, determining the key code value used, searching the corresponding content from the database, inputting the content in the position of the cursor or executing the corresponding instruction.

A touchpad-based fast information input interaction system, comprising:

an area dividing module, configured to divide the touchpad into a plurality of areas by coordinate points;

a correlation database creation and storage module, configured to create and store a database including the correlation between the touchpad coordinate areas and key code values and a database including the correlation between the key code values and stored contents, wherein each touchpad coordinate area corresponds to one or more key code values;

a touchpad function switching module, configured to switch the touchpad into keyboard function, wherein the keyboard function and the mouse function of the touchpad can be switched therebetween;

a trigger action signal and coordinate information obtaining module, configured to obtain, by operating system, a trigger action signal on the touchpad and the coordinate information of the corresponding position on the touchpad where the trigger action signal has been generated;

a key code value determination and execution module, configured to determine the key code value used, search the corresponding content from the database, and input the content in the position of the cursor or execute the corresponding instruction.

The touchpad function switching module comprises:

a first setting and storage module, configured to set a specific shortcut key or a specific gesture corresponding to the switching between the keyboard function and the mouse function of the touchpad, and store the specific shortcut key and the specific gesture into the database (during the setting, the shortcut key or the sliding of the gesture is detected, the key code value is recorded and stored in the database for the shortcut key, a series of coordinates corresponding to the gesture are recorded and stored in the database for the gesture);

a first detection and action execution module, configured to detect the I/O port of the system, and when the corresponding shortcut key (such as Alt+X) or gesture (such as C) is detected, switching between the keyboard function and the mouse function of the touchpad is performed.

Embodiment 6: a touchpad-based fast information input interaction method, comprising the following steps:

S1, dividing the touchpad into a plurality of areas by coordinate points;

S2, creating a database including the correlation between the touchpad coordinate areas and key code values and a database including the correlation between the key code values and stored contents, wherein each touchpad coordinate area corresponds to one or more key code values;

S3, switching the touchpad into keyboard function; obtaining, by the operating system, a trigger action signal on the touchpad and the coordinate information of the corresponding position on the touchpad where the trigger action signal has been generated; wherein the keyboard function and the mouse function of the touchpad can be switched therebetween; wherein the switching between the keyboard function and the mouse function of the touchpad is realized in the following manner:

S31, setting a specific shortcut key or a specific gesture (such as a graphic gesture C or sliding from the outside to the touchpad or sliding from switching area A of the touchpad to switching area B, etc.) corresponding to the switching between the keyboard function and the mouse function of the touchpad, and storing the specific shortcut key and the specific gesture into the database; as shown in FIGS. 6-9, the gesture comprises but is not limited to: a gesture identifier (such as C) or a gesture action of sliding from the outside to the touchpad or a gesture action of sliding from the switching area A of the touchpad to the switching area B (the switching area A can be set on the four corners of the touchpad, and the rest is the switching area B; the switching area A can also be set on the sides of the touchpad, and by the same token, the rest is the switching area B);

S32, detecting the I/O port of the system, and when the corresponding shortcut key (such as Alt+X) or gesture (such as C) is detected, switching between the keyboard function and the mouse function of the touchpad is performed;

S4, determining the key code value used, searching the corresponding content from the database, inputting the content in the position of the cursor or executing the corresponding instruction.

A touchpad-based fast information input interaction system, comprising:

an area dividing module, configured to divide the touchpad into a plurality of areas by coordinate points;

a correlation database creation and storage module, configured to create and store a database including the correlation between the touchpad coordinate areas and key code values and a database including the correlation between the key code values and stored contents, wherein each touchpad coordinate area corresponds to one or more key code values;

a touchpad function switching module, configured to switch the touchpad into keyboard function, wherein the keyboard function and the mouse function of the touchpad can be switched therebetween;

a trigger action signal and coordinate information obtaining module, configured to obtain, by the operating system, a trigger action signal on the touchpad and the coordinate information of the corresponding position on the touchpad where the trigger action signal has been generated;

a key code value determination and execution module, configured to determine the key code value used, search the corresponding content from the database, and input the content in the position of the cursor or execute the corresponding instruction.

The touchpad function switching module comprises:

a first setting and storage module, configured to set a specific shortcut key (such as Alt+X) or a specific gesture (such as a graphic gesture C or sliding from the outside to the touchpad or sliding from the switching area A of the touchpad to the switching area B) corresponding to the switching between the keyboard function and the mouse function of the touchpad, and store the specific shortcut key and the specific gesture into the database (during the setting, the shortcut key or the sliding of the gesture is detected, the key code value is recorded and stored in the database for the shortcut key, a series of coordinates corresponding to the gesture are recorded and stored in the database for the gesture);

a first detection and action execution module, configured to detect the I/O port of the system, and when the corresponding shortcut key (such as Alt+X) or gesture (such as C) is detected, switching between the keyboard function and the mouse function of the touchpad is performed.

The gesture in the setting and storage module comprises: a gesture identifier (such as C) or a gesture action of sliding from the outside to the touchpad or a gesture action of sliding from the switching area A of the touchpad to the switching area B (the switching area A can be set on the four corners of the touchpad, and the rest is the switching area B; the switching area A can also be set on the sides of the touchpad, and by the same token, the rest is the switching area B).

Embodiment 7: a touchpad-based fast information input interaction method, comprising the following steps:

S1, dividing the touchpad into a plurality of areas by coordinate points;

S2, creating a database including the correlation between the touchpad coordinate areas and key code values and a database including the correlation between the key code values and stored contents, wherein each touchpad coordinate area corresponds to one or more key code values;

S3, switching the touchpad into keyboard function; obtaining, by the operating system, a trigger action signal on the touchpad and the coordinate information of the corresponding position on the touchpad where the trigger action signal has been generated; wherein the keyboard function and the mouse function of the touchpad can be switched therebetween;

S4, determining the key code value used, searching the corresponding content from the database, inputting the content in the position of the cursor or executing the corresponding instruction; switching the touchpad into mouse function in the following manner: setting the length of one track as a threshold, when it is detected that the length of an inputted track is greater than the threshold, automatically switching the touchpad into mouse function.

A touchpad-based fast information input interaction system, comprising:

an area dividing module, configured to divide the touchpad into a plurality of areas by coordinate points;

a correlation database creation and storage module, configured to create and store a database including the correlation between the touchpad coordinate areas and key code values and a database including the correlation between the key code values and stored contents, wherein each touchpad coordinate area corresponds to one or more key code values;

a touchpad function switching module, configured to switch the touchpad into keyboard function, wherein the keyboard function and the mouse function of the touchpad can be switched therebetween;

a trigger action signal and coordinate information obtaining module, configured to obtain, by operating system, a trigger action signal on the touchpad and the coordinate information of the corresponding position on the touchpad where the trigger action signal has been generated;

a key code value determination and execution module, configured to determine the key code value used, search the corresponding content from the database, and input the content in the position of the cursor or execute the corresponding instruction;

a first mouse function switching module, configured to search the corresponding content from the database, input the content in the position of the cursor or execute the corresponding instruction, and then switch the touchpad into mouse function in the following manner: setting the length of one track as a threshold, when it is detected that the length of an inputted track is greater than the threshold, automatically switching the touchpad into mouse function.

Embodiment 8: a touchpad-based fast information input interaction method, comprising the following steps:

S1, dividing the touchpad into a plurality of areas by coordinate points;

S2, creating a database including the correlation between the touchpad coordinate areas and key code values and a database including the correlation between the key code values and stored contents, wherein each touchpad coordinate area corresponds to one or more key code values;

S3, switching the touchpad into keyboard function; obtaining, by the operating system, a trigger action signal on the touchpad and the coordinate information of the corresponding position on the touchpad where the trigger action signal has been generated; wherein the keyboard function and the mouse function of the touchpad can be switched therebetween; wherein the switching between the keyboard function and the mouse function of the touchpad is realized in the following manner:

S30, binding the starting function of the application program with the keyboard function of the touchpad;

S31, setting a specific shortcut key or a specific gesture (such as a graphic gesture C or sliding from the outside to the touchpad or sliding from switching area A of the touchpad to switching area B, etc.) corresponding to the switching between the keyboard function of the touchpad and the starting function of the application program and the mouse function of the touchpad, and storing the specific shortcut key and the specific gesture into the database;

S32, detecting the I/O port of the system, and when the corresponding shortcut key (such as Alt+X) or gesture (such as C) is detected, switching between the keyboard function of the touchpad and the starting function of the application program and the mouse function of the touchpad is performed; when the touchpad is switched into keyboard function, starting the application program; when the touchpad is switched into mouse function, closing the application program;

S4, determining the key code value used, searching the corresponding content from the database, inputting the content in the position of the cursor or executing the corresponding instruction.

A touchpad-based fast information input interaction system, comprising:

an area dividing module, configured to divide the touchpad into a plurality of areas by coordinate points;

a correlation database creation and storage module, configured to create and store a database including the correlation between the touchpad coordinate areas and key code values and a database including the correlation between the key code values and stored contents, wherein each touchpad coordinate area corresponds to one or more key code values;

a touchpad function switching module, configured to switch the touchpad into keyboard function, wherein the keyboard function and the mouse function of the touchpad can be switched therebetween;

a trigger action signal and coordinate information obtaining module, configured to obtain, by the operating system, a trigger action signal on the touchpad and the coordinate information of the corresponding position on the touchpad where the trigger action signal has been generated;

a key code value determination and execution module, configured to determine the key code value used, search the corresponding content from a database, and input the content in the position of the cursor or execute the corresponding instruction.

The touchpad function switching module comprises:

a binding module, configured to bind the starting function of an application program with the keyboard function of the touchpad;

a second setting and storage module, configured to set a specific shortcut key (such as Alt+X) or a specific gesture (for example, a graphic gesture C or sliding from the outside to the touchpad or sliding from the switching area A of the touchpad to the switching area B) corresponding to the switching between the keyboard function of the touchpad and the starting function of the application program and the mouse function of the touchpad, and store the specific shortcut key and the specific gesture into the database;

a second detection and action execution module, configured to detect the I/O port of the system, and when the corresponding shortcut key (such as Alt+X) or gesture (such as C) is detected, switching between the keyboard function of the touchpad and the starting function of the application program and the mouse function is performed; when the touchpad is switched into keyboard function, the application program is started; when the touchpad is switched into mouse function, the application program is closed.

Figure 5:
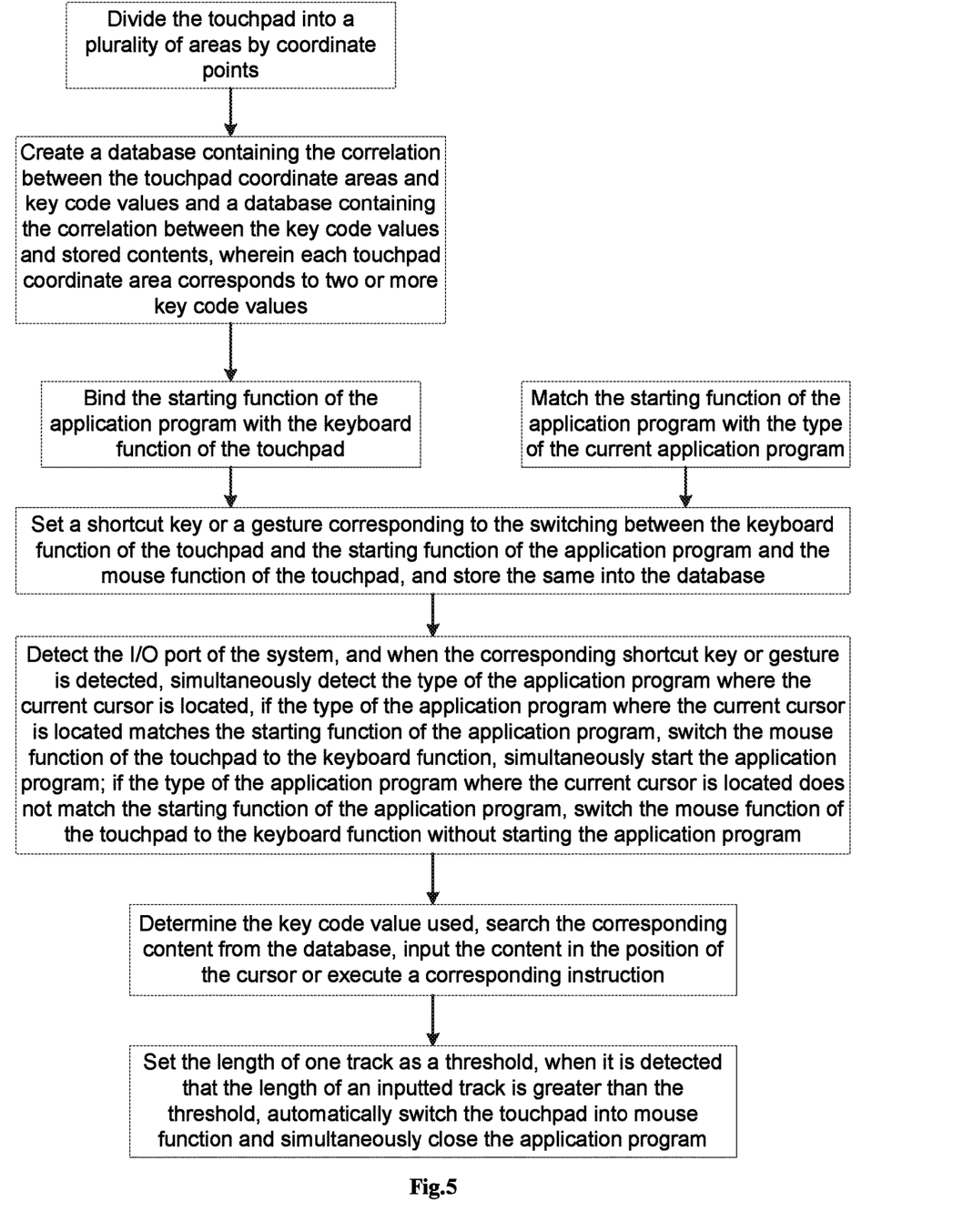
FIG. 5 is a flow chart of the method of embodiment 9.
Figure 6:
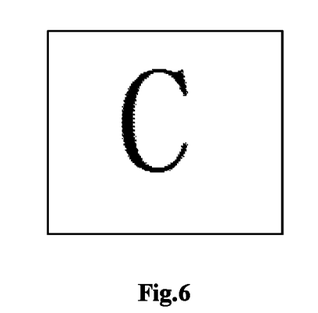
FIGS. 6~9 are schematic diagrams of the manners to realize a gesture.
Figure 7:
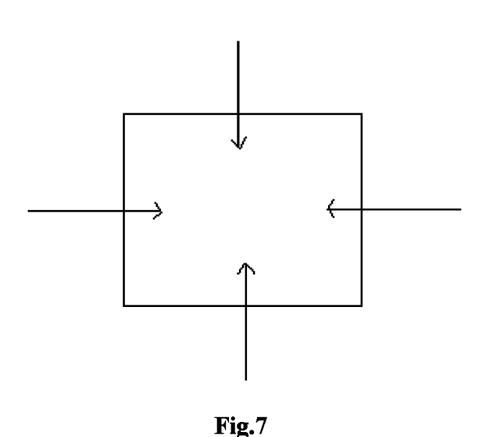
Figure 8:
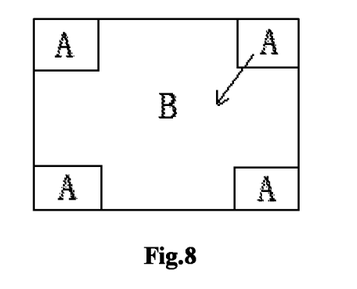
Figure 9:
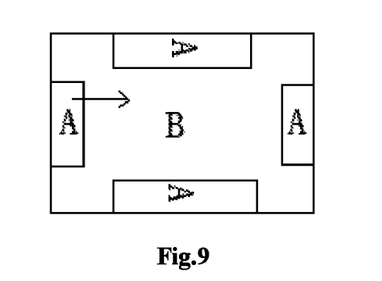

Embodiment 9: a touchpad-based fast information input interaction method, as shown in FIG. 5, comprising the following steps:

S1, dividing the touchpad into a plurality of areas by coordinate points;

S2, creating a database including the correlation between the touchpad coordinate areas and key code values and a database including the correlation between the key code values and stored contents, wherein each touchpad coordinate area corresponds to one or more key code values;

S3, switching the touchpad into keyboard function; obtaining, by the operating system, a trigger action signal on the touchpad and the coordinate information of the corresponding position on the touchpad where the trigger action signal has been generated; wherein the keyboard function and the mouse function of the touchpad can be switched therebetween; wherein the mouse function of the touchpad is switched into the keyboard function and the application program is started in the following manner:

S30, binding the starting function of the application program with the keyboard function of the touchpad;

S31, setting a specific shortcut key or a specific gesture (such as a graphic gesture C or sliding from the outside to the touchpad or sliding from switching area A of the touchpad to switching area B, etc.) corresponding to the switching between the keyboard function of the touchpad and the starting function of the application program and the mouse function of the touchpad, and storing the specific shortcut key and the specific gesture into the database;

S32, detecting the I/O port of the system, and when the corresponding shortcut key (such as Alt+X) or gesture (such as C) is detected, switching the mouse function of the touchpad to the keyboard function, starting the application program;

S4, determining the key code value used, searching the corresponding content from the database, inputting the content in the position of the cursor or executing the corresponding instruction;

S5, setting the length of one track as a threshold, when it is detected that the length of an inputted track is greater than the threshold, automatically switching the touchpad into mouse function and closing the application program.

Alternatively, in step S30, the starting function of the application program is bound with the keyboard function of the touchpad, and the starting function of the application program is matched with the type of the current application program. In step S32, the I/O port of the system is detected, when a corresponding shortcut key (such as Alt+X) or a gesture (such as C) is detected, the type of the application program where the current cursor is located is detected simultaneously. If the type of the application program where the current cursor is located matches the starting function of the application program, the mouse function of the touchpad is switched to the keyboard function to start the application program; if the type of the application program where the current cursor is located does not match the starting function of the application program, the mouse function of the touchpad is switched to the keyboard function without starting the application program. The "application program" in the "starting function of the application program" and the "application program" in the "type of the current application program" are two different types of application programs.

A touchpad-based fast information input interaction system, comprising:

an area dividing module, configured to divide the touchpad into a plurality of areas by coordinate points;

a correlation database creation and storage module, configured to create and store a database including the correlation between the touchpad coordinate areas and key code values and a database including the correlation between the key code values and stored contents, wherein each touchpad coordinate area corresponds to one or more key code values;

a touchpad function switching module, configured to switch the touchpad into keyboard function, wherein the keyboard function and the mouse function of the touchpad can be switched therebetween;

a trigger action signal and coordinate information obtaining module, configured to obtain, by the operating system, a trigger action signal on the touchpad and the coordinate information of the corresponding position on the touchpad where the trigger action signal has been generated;

a key code value determination and execution module, configured to determine the key code value used, search the corresponding content from a database, and input the content in the position of the cursor or execute the corresponding instruction;

a second mouse function switching module, configured to search the corresponding content from the database, input the content in the position of the cursor or execute the corresponding instruction, then switching the touchpad into mouse function and closing the application program in the following manner: setting the length of one track as a threshold, when it is detected that the length of an inputted track is greater than the threshold, automatically switching the touchpad into mouse function and closing the application program.

The touchpad function switching module comprises:

a binding module, configured to bind the starting function of an application program with the keyboard function of the touchpad;

a second setting and storage module, configured to set a specific shortcut key (such as Alt+X) or a specific gesture (for example, a graphic gesture C or sliding from the outside to the touchpad or sliding from the switching area A of the touchpad to the switching area B) corresponding to the switching between the keyboard function of the touchpad and the starting function of the application program and the mouse function of the touchpad, and store the specific shortcut key and the specific gesture into the database;

a second detection and action execution module, configured to detect the I/O port of the system, and when the corresponding shortcut key (such as Alt+X) or gesture (such as C) is detected, switching between the keyboard function of the touchpad and the starting function of the application program and the mouse function is performed: when the touchpad is switched into keyboard function, the application program is started; when the touchpad is switched into mouse function, the application program is closed.

Alternatively, the touchpad function switching module further comprises:

a matching module, configured to match the starting function of the application program with the type of the current application program;

the second detection and action execution module, configured to detect the I/O port of the system, and when the corresponding shortcut key (such as Alt+X) or gesture (such as C) is detected, detecting the type of the application program where the current cursor is located is performed simultaneously, if the type of the application program where the current cursor is located matches the starting function of the application program, switching the mouse function of the touchpad into keyboard function to start the application program; if the type of the application program where the current cursor is located does not match the starting function of the application program, switching the mouse function of the touchpad into keyboard function without starting the application program. The "application program" in the "starting function of the application program" and the "application program" in the "type of the current application program" are two different types of application programs.

What is claimed is:

1. A touchpad-based fast information input interaction system, comprising:

an area dividing module, configured to divide the touchpad into a plurality of areas by coordinate points;

a correlation database creation and storage module, configured to create and store a database including the correlation between the touchpad coordinate areas and key code values and a database including the correlation between the key code values and stored contents, wherein each touchpad coordinate area corresponds to one or more key code values;

a touchpad function switching module, configured to switch the touchpad into keyboard function, wherein the keyboard function and the mouse function of the touchpad can be switched therebetween;

a trigger action signal and coordinate information obtaining module, configured to obtain, by operating system, a trigger action signal on the touchpad and the coordinate information of the corresponding position on the touchpad where the trigger action signal has been generated;

a key code value determination and execution module, configured to determine the key code value used to search the corresponding content from the database, and input the content in the position of the cursor or execute a corresponding instruction, wherein the touchpad function switching module comprises:

a binding module, configured to bind the starting function of the application program with the keyboard function of the touchpad;

a second setting and storage module, configured to set a specific shortcut key or a specific gesture corresponding to the switching between the keyboard function of the touchpad and the starting function of the application program and the mouse function of the touchpad, and store the specific shortcut key and the specific gesture into the database;

a second detection and action execution module, configured to detect the I/O port of the system, and when the corresponding shortcut key or gesture is detected, switching between the keyboard function of the touchpad and the starting function of the application program and the mouse function of the touchpad is performed: when the touchpad is switched into keyboard function, the application program is started; when the touchpad is switched into mouse function, the application program is closed.

2. The touchpad-based fast information input interaction system according to claim 1, wherein the key code value determination and execution module comprises:

an application program detection module, configured to detect the current application program;

a first determination and action execution sub-module, configured to determine the key code value used according to the type of the application program, search the corresponding content from the database and execute the corresponding instruction; wherein the key code values correspond one to one to the stored contents.

3. The touchpad-based fast information input interaction system according to claim 1, wherein the key code value determination and execution module comprises:

an operating system version or language detection module, configured to detect the version or language of the current operating system;

a second determination and action execution sub-module, configured to determine the key code value used according to the version type or language type of the operating system, then search the corresponding content from the database and input the content in the position of the cursor, wherein the key code values correspond one to one to the stored contents.

4. The touchpad-based fast information input interaction system according to claim 1, wherein the touchpad function switching module comprises:

a first setting and storage module, configured to set a specific shortcut key or a specific gesture corresponding to the switching between the keyboard function and the mouse function of the touchpad, and store the specific shortcut key and the specific gesture into the database;

a first detection and action execution module, configured to detect the I/O port of the system, and when the corresponding shortcut key or gesture is detected, switching between the keyboard function and the mouse function of the touchpad is performed.

5. The touchpad-based fast information input interaction system according to claim 1, further comprising:

a first mouse function switching module, configured to search the corresponding content from the database, input the content in the position of the cursor or execute the corresponding instruction, and then switch the touchpad into mouse function in the following manner: setting the length of one track as a threshold, when it is detected that the length of an inputted track is greater than the threshold, automatically switching the touchpad into mouse function.

6. The touchpad-based fast information input interaction system according to claim 1, further comprising:

a second mouse function switching module, configured to search the corresponding content from the database, input the content in the position of the cursor or execute the corresponding instruction, then switching the touchpad into mouse function and closing the application program in the following manner: setting the length of one track as a threshold, when it is detected that the length of an inputted track is greater than the threshold, automatically switching the touchpad into mouse function and closing the application program.

* * * * *